United States Patent [19]

Lederman

[11] Patent Number: 5,046,248
[45] Date of Patent: Sep. 10, 1991

[54] THRUST ROLLER BEARING WITH IMPROVED ASSEMBLY

[75] Inventor: Frederick E. Lederman, Sandusky, Ohio

[73] Assignee: General Motors Corporation, Detroit, Mich.

[21] Appl. No.: 566,204

[22] Filed: Aug. 13, 1990

Related U.S. Application Data

[62] Division of Ser. No. 397,205, Aug. 23, 1989, abandoned.

[51] Int. Cl.$^5$ ............................................. B21D 53/12
[52] U.S. Cl. ............................. 29/898.041; 29/413; 29/898.049; 29/898.051
[58] Field of Search ............. 29/898, 898.04, 898.041, 29/898.049, 898.05, 898.051, 898.06, 898.061, 898.062, 898.064, 898.067, 898.068, 898.07, 898.09, 898.15, 412, 413, 418; 384/618, 620, 623, 559, 560, 561, 584, 565, 909; 264/163

[56] References Cited

U.S. PATENT DOCUMENTS

| 2,975,128 | 3/1961 | Stott | 384/909 X |
| 4,541,744 | 9/1985 | Lederman | 384/607 |
| 4,580,327 | 4/1986 | Juy | 29/413 X |
| 4,602,875 | 7/1986 | Doerr et al. | 384/547 |
| 4,679,676 | 7/1987 | King et al. | 192/45 |
| 4,822,183 | 4/1989 | Lederman | 384/607 |

Primary Examiner—Joseph M. Gorski
Assistant Examiner—S. Thomas Hughes
Attorney, Agent, or Firm—Patrick M. Griffin

[57] ABSTRACT

An all plastic taper thrust bearing has a separately handled, integrally molded roller and separator unit, from which the rollers are broken away as the bearing is assembled.

2 Claims, 3 Drawing Sheets

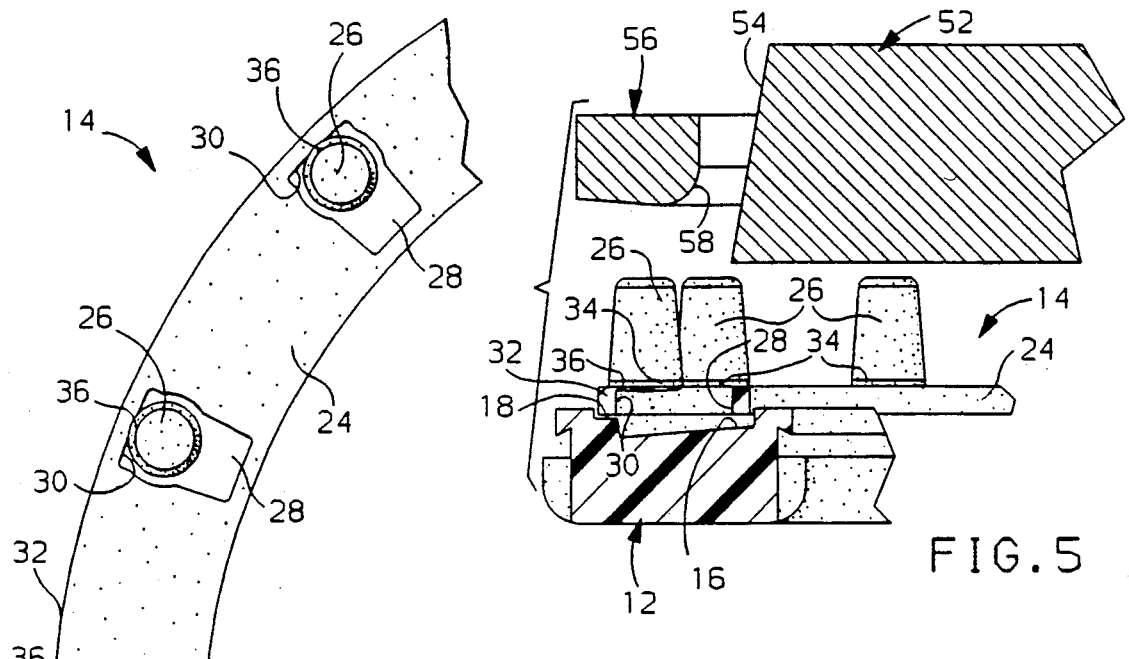
FIG. 4
FIG. 5
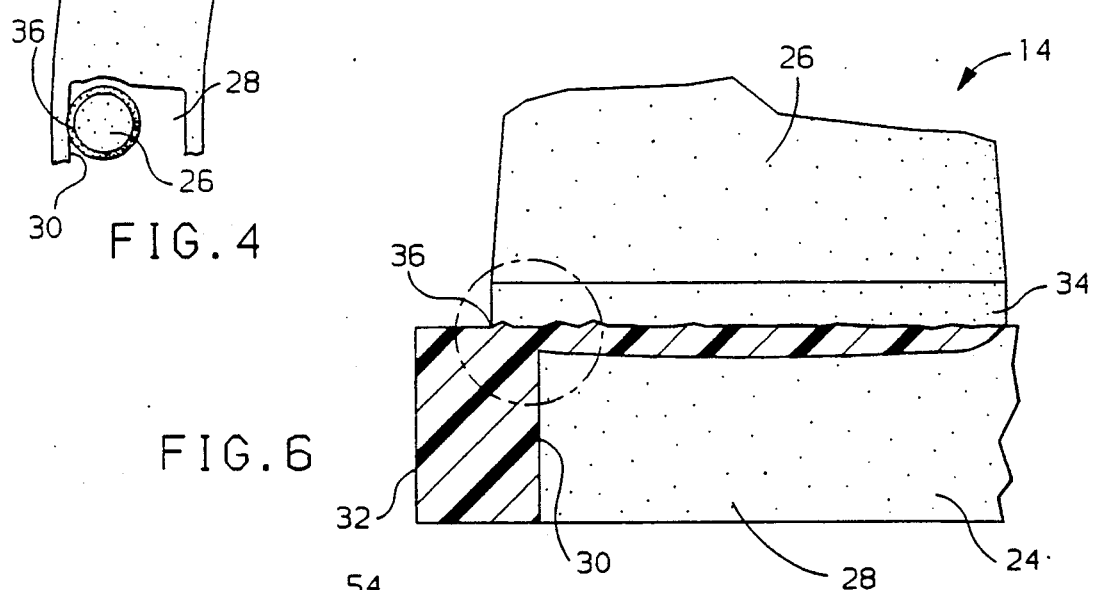
FIG. 6
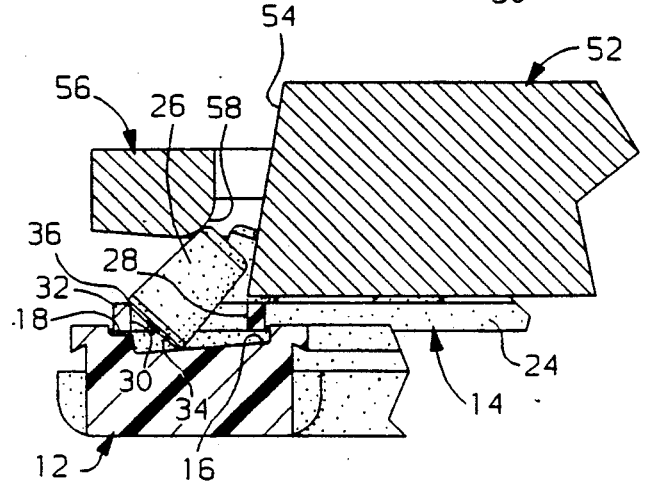
FIG. 7

THRUST ROLLER BEARING WITH IMPROVED ASSEMBLY

This is a division of application Ser. No. 07/397,205 filed on Aug. 23, 1989, now abandoned.

This invention relates to roller thrust bearings in general, and specifically to a taper thrust bearing with simplified manufacture and assembly.

BACKGROUND OF THE INVENTION

Rolling element thrust bearings are often used in automotive McPherson struts to give superior steering feel. These are most often ball bearings, but roller bearings, whether purely cylindrical or tapered, offer the greatest potential load support. There has been an increasing use of plastic in such bearings, either in housings that snap together over rollers and races, as separators for the rollers, or both. Plastic offers advantages in terms of weight and cost savings, and is especially useful in the highly corrosive environment involved. Plastic parts are even more useful if they can be designed so as to be by-pass molded, that is, molded by a single pair of mold halves that part along a straight line, with no need for slides or mold inserts. A roller thrust bearing that was all plastic would be highly desirable.

SUMMARY OF THE INVENTION

The invention provides an all plastic roller thrust bearing for such an application, one in which the parts can be by-pass molded, and which also offers a simplified manufacture and assembly.

In the preferred embodiment disclosed, a pair of molded plastic bearing races each has an identical annular pathway. When the races are disposed coaxially, the pathways are axially opposed so as to receive a complement of rollers between them. The rollers and their separator are also molded plastic, and, in addition, are molded integrally together as a single unit that can be separately handled, rather than as conventional, separate pieces. The separator is annular in shape, and approximately the same size as the race pathways. A circumferentially spaced array of pockets opens through the separator, concentric with the race pathways. Each pocket is generally rectangular in shape, and is oriented symmetrically about a radial plane of the separator. Each pocket also has at least a radially outer edge. The rollers are generally cylindrical, shallow tapered rollers in the embodiment disclosed, and the larger end of each roller is molded to the separator at the outer edge of a respective pocket. The joint comprises a small chordal area of overlap between the roller end and pocket outer edge, and each roller is also oriented with its axis disposed in its pockets central, radial plane. In addition, in the embodiment disclosed, each roller axis is oriented perpendicular to the separator, so the whole unit can be by-pass molded.

Though small in area, the roller-separator joint is strong enough that the unit can withstand normal handling without fracturing. However, the joint will fracture when a sufficient assembly force is applied to the roller in a direction so as to pivot it axially downwardly and radially inwardly about the joint. This allows the bearing to be assembled by placing the separator on one of the races, coaxial to the pathway, and then applying the necessary assembly force to each of the rollers. Because of the size and orientation of the rollers relative to the separator pockets, each will tip down into a pocket and against the pathway as it breaks free. Then, the other race can be added to complete the bearing. Thus, a multi-piece bearing can be assembled with the necessity of handling only three basic components.

It is, therefore, an object of the invention to provide an all plastic thrust roller bearing with simplified manufacture and assembly.

It is another object of the invention to provide such a bearing in which the rollers are integrally molded to a separator at a frangible joint that allows the rollers and separator to be handled as a unit.

It is another object of the invention to orient the rollers relative to the separator in such a away that an assembly force applied to the rollers pivots them into a respective separator pocket as the joints fracture.

It is another object of the invention to provide a method and apparatus for so manufacturing and assembling such a bearing.

DESCRIPTION OF THE PREFERRED EMBODIMENT

These and other objects and features of the invention will appear from the following written description, and from the drawings, in which:

FIG. 4 is a top plan view of a section of the separator-roller unit;

FIG. 5 is a view of the beginning of the assembly process, showing one race and the assembly apparatus in cross section;

FIG. 6 is an enlargement of a portion of the separator-roller unit, with the end of a roller partially broken away so as to show the frangible joint in cross section;

FIG. 7 is a view like FIG. 5, but showing the apparatus beginning to break the rollers away from the separator and pivot them down;

Figure 1:
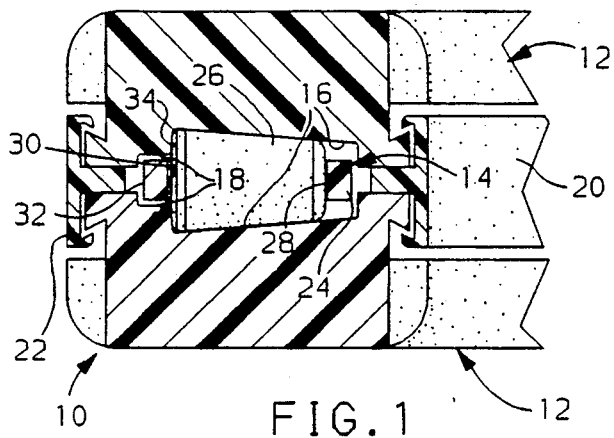
FIG. 1 is a cross sectional view of a preferred embodiment of the bearing of the invention assembled, showing one of the rollers in elevation.
Figure 2:
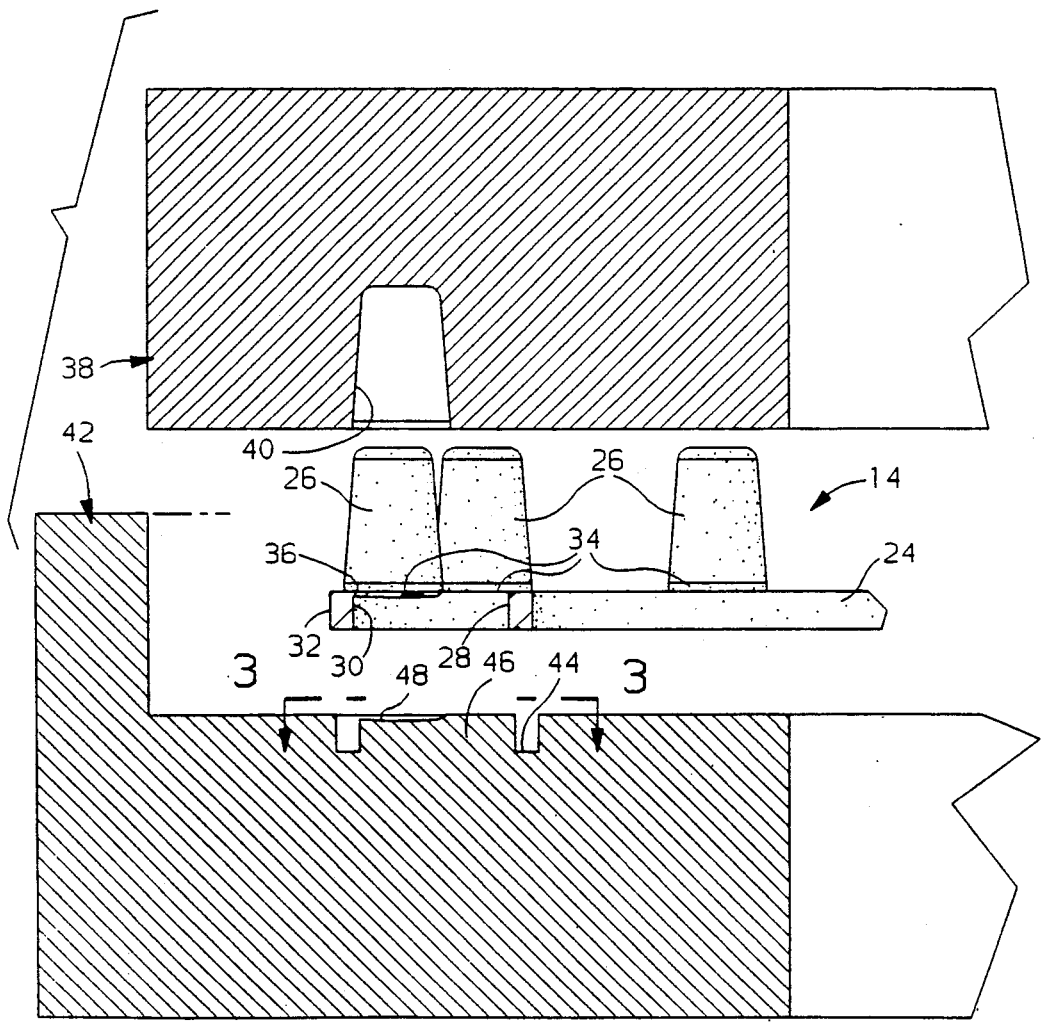
FIG. 2 is a view of the separator-roller unit, and the two mold halves that mold it, shown in cross section.
Figure 8:
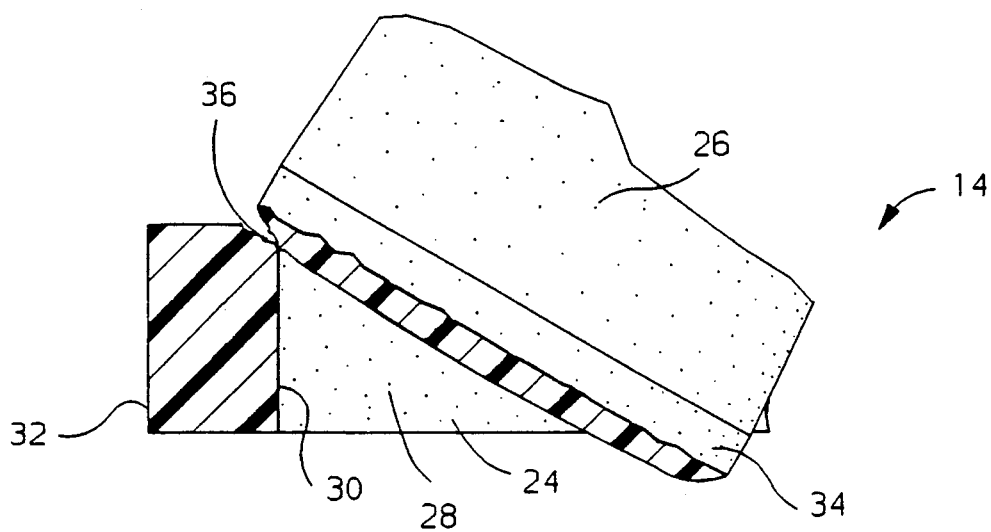
FIG. 8 is a view like 6, but showing the joint fracturing.

Referring first to FIGS. 1 and 2, a preferred embodiment of the thrust roller bearing of the invention is indicated generally at 10. Bearing 10 includes three basic components, a pair of thrust races, each of which is indicated generally at 12, and a separator-roller unit, indicated generally at 14. Each race 12 is molded of a suitably hard plastic material, such as nylon, and each has an annular pathway 16 bordered on the radially outer edge by an annular shoulder 18. When the races 12 are coaxially disposed, the two pathways 16 are axially opposed, as shown. In operation, the races 12 are generally subject only to thrust loads that would push them together, but a pair of inner and outer sealing snap rings 20 and 22 hold them together before bearing 10 is installed in a suspension.

Referring next to FIGS. 2, 4 and 6, the separator-roller unit 14, is integrally molded of the same plastic as races 12. Separator 24 is an annular ring similar in size to a pathway 16, with an evenly spaced plurality of roller pockets 28 opening through it. Each pocket 28 is generally rectangular in shape with a predetermined radial length, but has a shallow taper, so that its radially outer edge 30 is slightly longer. Each pocket 28 is oriented symmetrical to separator 24, that is, a central plane that bisects it is also a radial plane of the separator 24. The outer circular edge 32 of separator 24 has the same diameter as a pathway shoulder 18. Each roller 26 is generally cylindrical, but with a slight taper in the embodiment disclosed, and an axial length just slightly less the length of a pocket 28. The larger, outer end 34 of each roller 26 is integrally molded to separator 24 at the outer edge 30 of a respective pocket 28. Specifically, the pocket outer edge 30 overlaps a small chordal area of the roller outer end 34 to create a joint 36, circled in FIG. 6. The axis of each roller 26 is disposed in the central, radial plane of its respective pocket 28, and is also parallel to the axis of separator 24, for reasons described below. Each joint 36 is strong enough to withstand the normal forces that would be seen during shipping and handling, so the unit 14 can be effectively handled as a single component. However, if a sufficient pressing force is applied to a roller 26 to pivot it about its joint 36 in an axially downward, radially inward direction, it will fracture.

Figure 3:
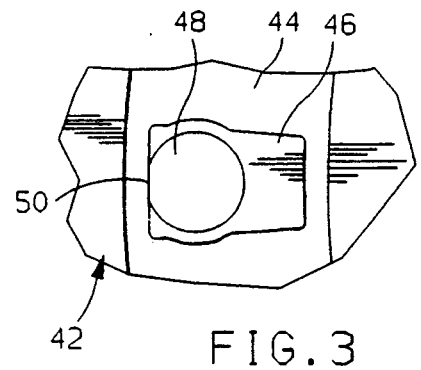
FIG. 3 is a view of part of the lower mold half from the perspective of the plane 3—3 of FIG. 2.

Referring next to FIGS. 2 and 3, it may be seen how the shape and design of unit 14 allows it to be integrally, by-pass molded. An annular upper mold half, indicated generally at 38, has a series of thimble shaped cavities 40 machined into it, one for each roller 26. Since each roller is oriented with its larger end 34 lowest and with its axis parallel to the axis of separator 24, each cavity 40 tapers outwardly with its axis parallel to the central axis of upper mold half 38, and has no undercuts relative to the central axis. A coaxially disposed lower mold half, indicated generally at 42, has an annular trough 44 machined into it, which is the same size as separator 24. Evenly spaced around the bottom of trough 44 are a series of pocket forming projections 46, each of which has a shallow dished depression 48 machined into it. Each projection 46 is the same size as a pocket 28, and all of its surfaces are also machined so as to have no undercuts relative to the central coaxis of the mold halves 38 and 42. As best seen in FIG. 3, the depression 48 overlaps at a small chordal area 50 with the back edge of the projection 46. After then the mold halves 38 and 42 are brought axially together and closed, each depression 48 is aligned with a cavity 40. When molten plastic is injected, the separator 24 is formed in the closed off trough 44, and the rollers 26 are formed where the cavities 40 are closed off by the projections 46. The overlaps 50 form the joints 36. Because the various shapes machined into the mold halves 38 and 42 have no undercuts relative to their coaxis, they may be simply parted in a straight line motion, leaving the completed unit 14, as shown in FIG. 2.

Figure 9:
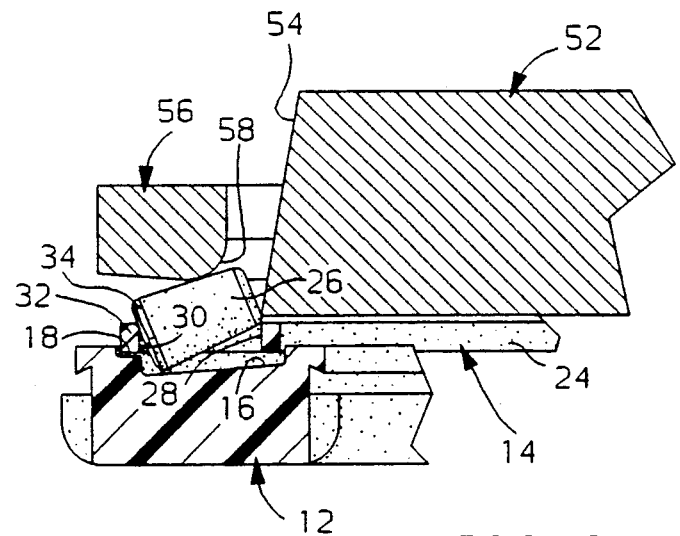
FIG. 9 is a view like 7, but with the roller pivoted most of the way down.
Figure 10:
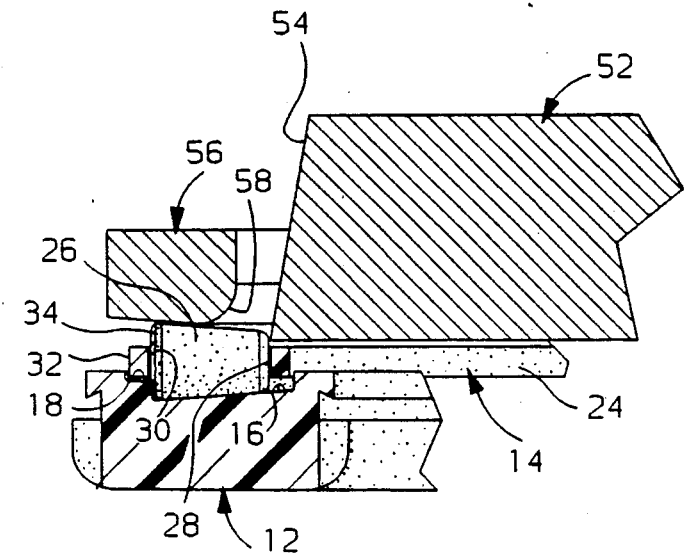
FIG. 10 is a view with the roller pivoted all the way down, before the final race is added.

Referring next to FIGS. 7 through 10, the various steps in the assembly of bearing 10 are illustrated. An assembly apparatus includes a central plunger, indicated generally at 52, which has a bottom diameter approximately equal to the inner diameter of separator 24 and a conical side surface 54. Surrounding plunger 52 is a concentric slide ring, indicated generally at 56, which is axially movable relative to plunger 52, and which has a rounded inner edge 58 that is radially spaced from plunger side surface 54. To assemble bearing 10, separator 24 is placed on one of the race pathways 16, with its outer edge 32 concentric to and abutted with the pathway shoulder 18. The roller outer ends 34 are spaced above the pathway 16, by the thickness of separator 24. Then, plunger 52 is brought axially down concentric with race 12 until it seats on the inside of separator 24. Next, slide ring 56 is brought axially down until its rounded edge 58 contacts the upper ends of the rollers 26. Since the rollers are cantilevered in from the joints 36 and above pathway 16, they pivot axially downwardly and radially inwardly about the joints 36 under the pressing force of the ring 56. The roller outer ends 34 each move simultaneously down into a respective pocket 28. The rollers 26 fold down farther into the pockets 28 until the edge of the roller outer ends 34 hit the pathway 16, as shown in FIG. 7, and the ring rounded edge 58 begins to slide down the tapered outer sides of the rollers 26. This motion fractures the joints 36, as show in FIG. 8. As ring 56 continues to move down, its rounded edge 58 slides farther along the outer tapered surfaces of the rollers 26 and the upper ends of the rollers 26 are pushed into, and slide down, the plunger conical side 54, as shown in FIG. 9. This slides the roller lower ends 34 radially out in their pockets 28, along the bottom surface of the pathway 16, which folds the rollers 26 down until they are fully seated in their respective pockets 28. Then, plunger 52 and rings 56 can be withdrawn, and the other race 12 added with the snap rings 20 and 22 to complete bearing 10.

Variations in the preferred embodiment, and in its manufacture and assembly, may be made. The rollers 26 could be completely cylindrical, although the tapered rollers 26 are especially advantageous in that they cooperate with the ring rounded edge 58 to create the radially inward pivoting force during assembly. So long as the axes of the rollers 26 are disposed in the central, radial planes of the pockets 28, they will pivot down into the pockets 28. Therefore, the rollers 26 would not have to be disposed with their axes absolutely vertical. If the axes of rollers 26 were already tipped inwardly to an extent, in a conical configuration, that could aid in their downward pivoting action during assembly. However, the separator-roller unit 14 could not then be by-pass molded, which is a great advantage. The assembly apparatus shown could potentially be eliminated if the upper race 12 were moved down with a wobbling or nutating action, a motion similar to that made by the edge of a spinning coin as it settles on a table. So moving the upper race 12 would fold the rollers 26 down and into the pockets 28, so long as the rollers 26 were oriented as shown relative to separator 24. Therefore, it will be understood that it is not intended to limit the invention to just the embodiment disclosed.

The embodiments of the invention in which an exclusive property or privilege is claimed are defined as follows:

1. A method of manufacturing a thrust roller bearing having a pair of bearing races, each of said races having an annular pathway formed around an axis and being axially opposable to each other, comprising the steps of, molding an integral plastic roller and separator unit having an annular separator with a cricumferentially spaced array of pockets opening therethrough, said separator being concentric with said pathways, each of said pockets having a radially outer edge symmetrical to a radial plane of said separator, said roller and separator unit further including a plurality of generally cylindrical rollers, each of said rollers having an outer end integrally molded at a joint to the outer edge of a respective pocket with the central axis of each of said rollers disposed in said separator radial plane and substantially perpendicular to said separator and said respective pocket, said joint sufficiently strong to allow said unit to withstand normal handling but frangible when a pressing force is applied to each of said rollers.

placing said unit against one of said races concentric to the pathway of said one race, applying a pressing force to each of said rollers, thereby fracturing said joints and pivoting each of said rollers axially downwardly and radially inwardly relative to said separator until said rollers are each filly seated into said respective pocket, and, placing the other of said races into coaxial relation to said one race, thereby completing said bearing.

2. A method of manufacturing a thrust roller bearing having a pair of bearing races, each of said races having an annular pathway formed around an axis and axially opposable to the other pathway, comprising the steps of, molding an integral plastic roller and separator unit, said unit being comprised of an annular separator having an axis and a circumferentially spaced array of pockets opening therethrough said separator being concentric with said pathways, each of said pockets having a radially outer edge and also being symmetrical to a radical plane of said separator, said unit further including a plurality of tapered rollers, each of said rollers having a larger, outer end integrally molded at a joint to the outer edge of a respective pocket with the central axes of said rollers disposed in said separator radial plane, perpendicular to said separator and said respective pocket, and parallel to said separator axis, said joints further being sufficiently strong to allow said unit to withstand normal handling but frangible when a pressing force is applied to each of said rollers, sliding a ring down the outer sides of said tapered rollers, thereby applying a pressing force simultaneously to said rollers, thereby breaking said joints by creating a radially inward pivoting force and, thereby pivoting said rollers axially downwardly and radially inwardly relative to said separator until said rollers are fully seated into said respective pockets, withdrawing said ring, and placing the other of said races into coaxial relation to said one race thereby completing said bearing.

* * * * *